Feb. 14, 1956   B. I. HAYFORD ET AL   2,735,042
METAL CLAD SWITCHGEAR

Filed June 26, 1952   5 Sheets-Sheet 1

WITNESSES:
Robert A Baird
Tru. L. Groome

INVENTORS
Benjamin I. Hayford &
Lloyd E. Keck.
BY
ATTORNEY

Feb. 14, 1956 B. I. HAYFORD ET AL 2,735,042
METAL CLAD SWITCHGEAR
Filed June 26, 1952 5 Sheets-Sheet 2

INVENTORS
Benjamin I. Hayford &
Lloyd E. Keck.
BY
ATTORNEY

WITNESSES:

INVENTORS
Benjamin I. Hayford &
Lloyd E. Keck.
ATTORNEY

Feb. 14, 1956 B. I. HAYFORD ET AL 2,735,042
METAL CLAD SWITCHGEAR
Filed June 26, 1952 5 Sheets-Sheet 4

WITNESSES:
Robert C Baird
W. C. Groove

INVENTORS
Benjamin I. Hayford &
Lloyd E. Keck.
BY
ATTORNEY

Feb. 14, 1956　B. I. HAYFORD ET AL　2,735,042
METAL CLAD SWITCHGEAR
Filed June 26, 1952　5 Sheets-Sheet 5
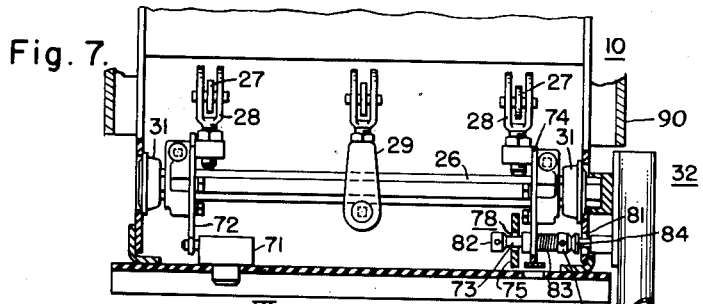
Fig. 7.
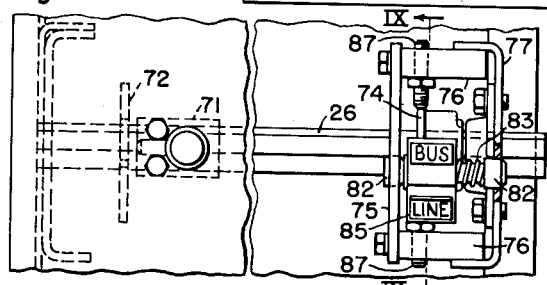
Fig. 8.
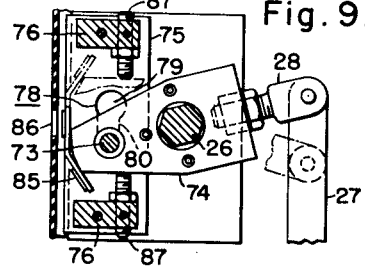
Fig. 9.
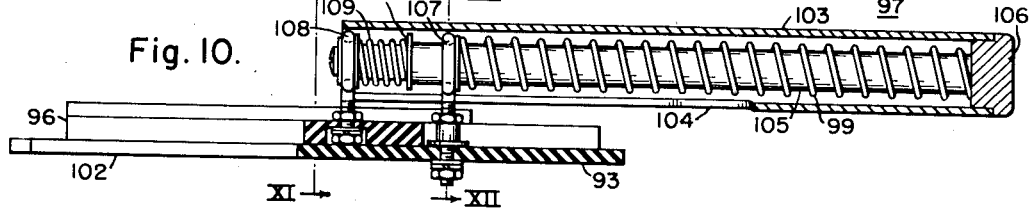
Fig. 10.
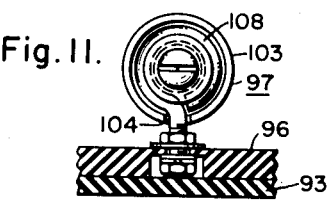
Fig. 11.
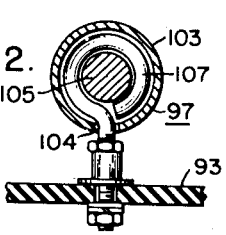
Fig. 12.
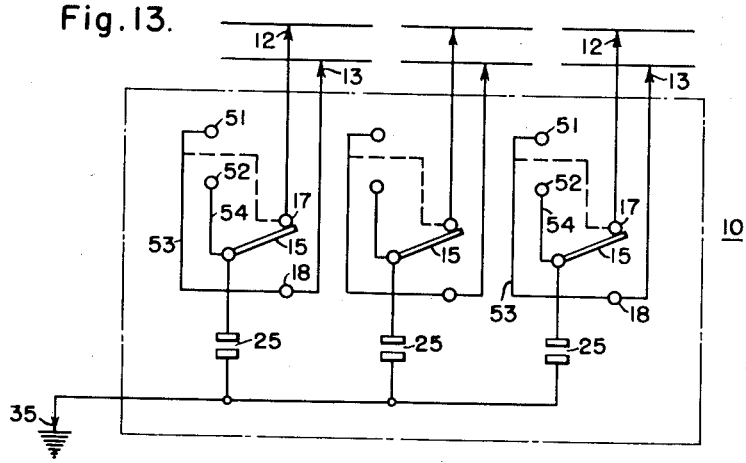
Fig. 13.
INVENTORS
Benjamin I. Hayford &
Lloyd E. Keck.
BY 
ATTORNEY

United States Patent Office 2,735,042
Patented Feb. 14, 1956

2,735,042

METAL CLAD SWITCHGEAR

Benjamin I. Hayford and Lloyd E. Keck, Pittsburgh, Pa., assignors to Westinghouse Electric Corporation, East Pittsburgh, Pa., a corporation of Pennsylvania Application June 26, 1952, Serial No. 295,676

19 Claims. (Cl. 317—99)

Our invention relates, generally, to metal clad switchgear and, more particularly, to grounding and testing devices for use in metal clad switchgear housings or cells.

It is desirable to be able to ground high-voltage electric circuits to insure the safety of workmen working on either these circuits or associated apparatus. In metal clad switchgear all conductors are so insulated that the only points available to apply safety grounds to a circuit are at the primary disconnecting contacts, thereby making it necessary to provide a grounding device for use with these contacts in the metal clad switchgear.

There is some hazard involved in case the operator makes a mistake and starts to ground a live circuit. In order to avoid this risk to life and property, various devices have been made for checking and interlocking against applying grounds to a live circuit. However, under certain conditions it may be desirable to be able to ground a live circuit, provided the grounding device is capable of making the ground connection with safety.

It is also desirable to be able to check voltages, phase out, or apply potential for cable testing while the grounding device is in the switchgear housing. The device should also provide for grounding either the bus or the line circuits available in a metal clad switchgear housing.

An object of our invention, generally stated, is to provide a combined grounding and testing device which shall be simple and efficient in operation and which may be economically manufactured and installed.

A more specific object of our invention is to provide a grounding and testing device suitable for insertion into a metal clad switchgear cell or housing in place of a removable circuit breaker unit.

Another object of our invention is to provide protective interlocking for a grounding and testing device.

A further object of our invention is to provide a double-throw selector switch for a combined grounding and testing device.

A still further object of our invention is to provide automatically actuated isolating barriers for the selector switch in a grounding and testing device.

Still another object of our invention is to provide a remotely controlled, electrically actuated grounding switch for a grounding and testing device.

Other objects of our invention will be explained fully hereinafter or will be apparent to those skilled in the art.

In accordance with one embodiment of our invention a combined grounding and testing device is so constructed that it may be inserted into a metal clad switchgear housing in place of a circuit breaker unit of the horizontal drawout type. The device has a manually operable, double-throw selector switch for selecting either the line or the bus for grounding through a remotely controlled, electrically operated grounding switch. Mechanical interlocking is provided to prevent the improper operation of the grounding and the selector switches. The circuit members not selected by the selector switch are completely enclosed by automatically actuated barriers, thereby isolating the circuit being grounded or tested from the live circuit. Test ports are provided for testing and phasing out the circuits.

For a better understanding of the nature and objects of the invention, reference may be had to the following detailed description and the accompanying drawings, in which:

Fig. 7 is a view, in section, taken along the line VII—VII in Fig. 2, showing the handle for operating the selector switch in position on the switch shaft;

Fig. 8 is an enlarged view, in front elevation, of part of the selector switch mechanism, the switch operating handle being removed;

Fig. 9 is an enlarged view, in section, taken along the line IX—IX in Fig. 8;

Fig. 10 is an enlarged view, in section, of the spring mechanism for actuating the isolating barrier for the selector switch;

Fig. 11 is a view, in section, taken along the line XI—XI in Fig. 10;

Fig. 12 is a view, in section, taken along the line XII—XII in Fig. 10, and

Fig. 13 is a diagrammatic view, showing the circuit connections for the grounding and testing device.

Figure 1:
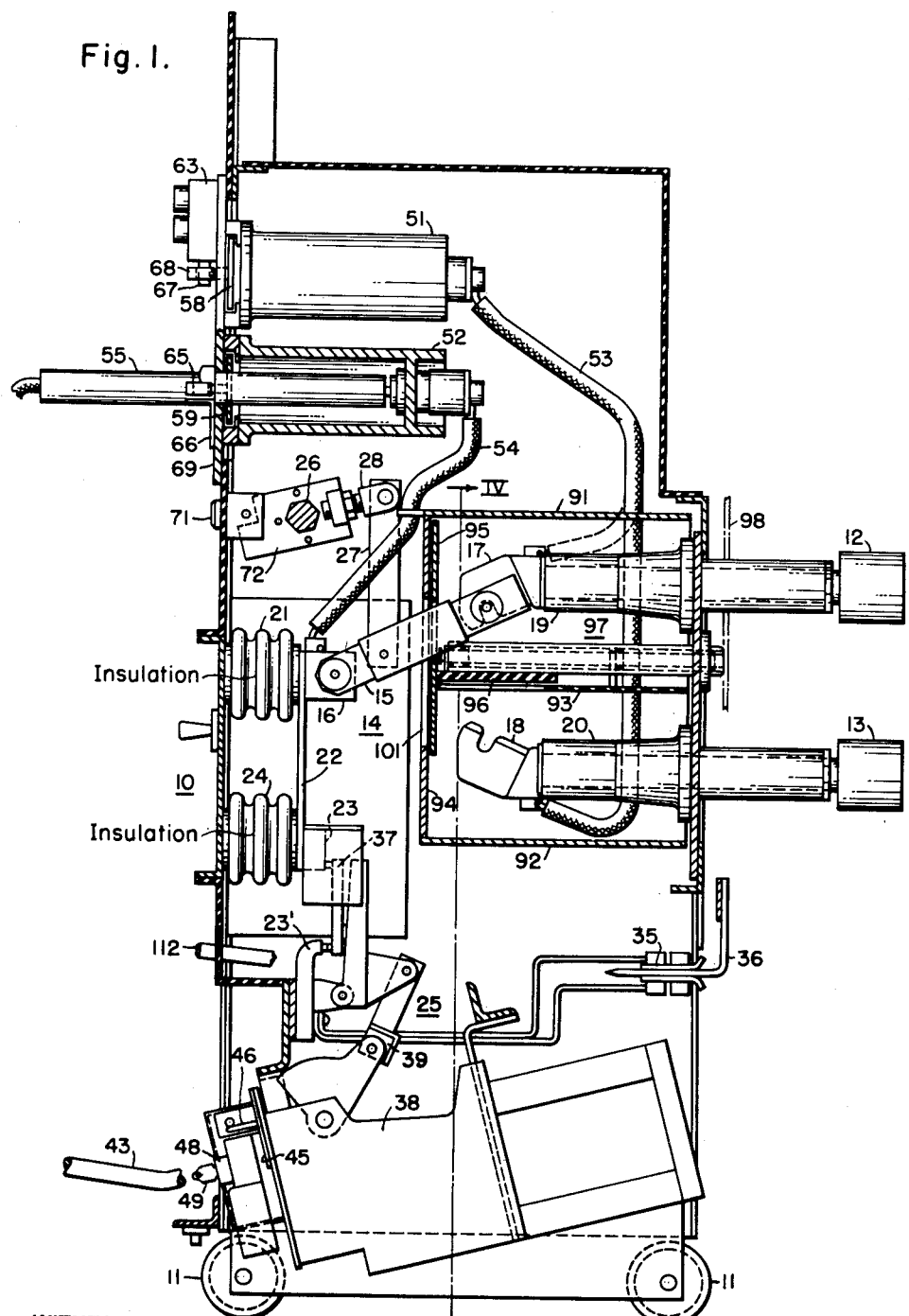
Figure 1 is a view, partly in section and partly in side elevation, of a grounding and testing device embodying the principal features of the invention.
Figure 2:
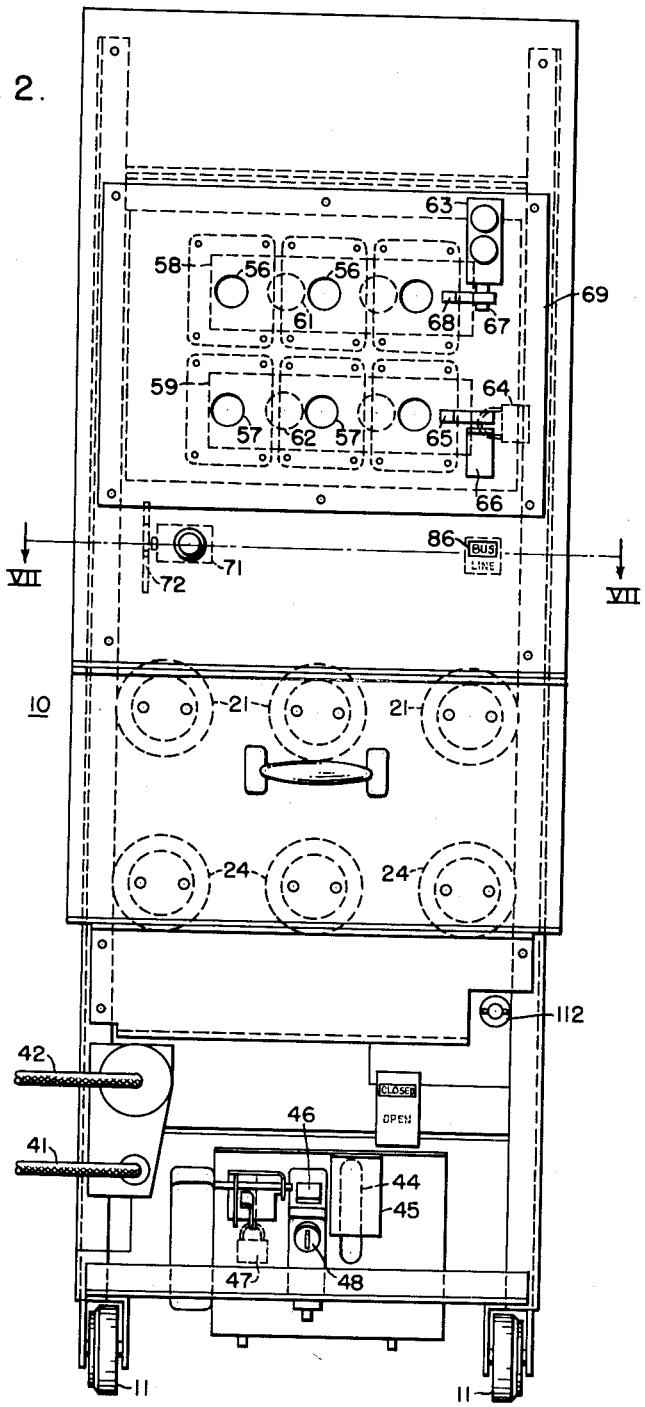
Fig. 2 is a view, in front elevation, of the device shown in Fig. 1.

Referring to the drawings, and particularly to Figs. 1 and 2, the combined grounding and testing device shown therein comprises a truck frame structure 10 having wheels 11 thereon for rolling the truck structure into a metal clad switchgear housing or cell (not shown). The truck 10 is so constructed that it may be inserted into the cell in place of a metal clad circuit breaker unit of the horizontal drawout type. It will be understood that the device 10 may be so constructed that it may be utilized in metal clad switchgear of the vertical lift type, that is, switchgear in which the removable circuit breaker unit is first moved into the cell horizontally and then raised vertically to the operating position of the circuit breaker unit.

The present device carries two sets 12 and 13 of primary disconnecting contact members which are disposed to engage fixed disconnecting contact members mounted in the switchgear housing in a manner similar to that in which the primary disconnecting contact members of a circuit breaker unit engage the fixed disconnecting contact members in the cell when the circuit breaker unit is inserted into the cell. Since the disconnecting contact members in the cell are connected to electric power conductors, such as the main bus and the line or feeder conductors, the contact members 12 and 13 are connected to the power conductors when the device 10 is inserted into the cell. The disconnecting contact members 12 and 13 may be of a type well-known in the switchgear art.

As explained hereinbefore, it is desirable to be able to ground either the bus conductors or the line conductors in order to insure the safety of men working on these circuits or the apparatus connected thereto. In order to provide for selectively grounding one or the other of the sets of disconnecting contact members which, as explained hereinbefore, are connected to the power circuits, a double-throw selector switch 14 is mounted in the grounding device 10.

The selector switch 14 comprises switch blades 15 which are hinged on support members 16 and are disposed to engage either contact members 17 or 18 which are mounted on support members 19 and 20, respectively, and are electrically connected to the disconnecting contact members 12 and 13, respectively. The support members 16 are mounted upon insulators 21 which, in turn, are mounted in the truck frame 10. The supports 16 are electrically connected through conductors 22 to fixed contact members 23 which are supported by insulators 24 also mounted in the truck structure 10. The contact members 23 are associated with a grounding switch 25, as will be more fully described hereinafter.

The blades 15 of the selector switch 14 are mechanically connected to a rotatable operating shaft 26 by means of insulating links 27 and arms 28 or 29. As shown most clearly in Fig. 7, the shaft 26 is rotatably mounted in bearings 31 in the truck structure 10. The shaft 26 may be rotated by an operating handle 32 having a socket which may be inserted over one end of the shaft 26 which extends through one side of the truck structure 10.

The grounding switch 25 is provided for electrically connecting the blades 15 of the selector switch 14 to a grounding contact member 35 which is disposed to engage a grounded contact member 36 when the device 10 is inserted into the switchgear cell. The grounding switch 25 has bridging contact members 37 which engage the fixed contact members 23 and 23' when the switch 25 is closed. The contact members 27 are actuated by means of a solenoid mechanism 38 and a linkage mechanism 39. The solenoid mechanism 38 and the linkage 39 may be similar to those utilized for operating electrically operated circuit breakers.

The solenoid 38 may be remotely controlled from a push-button switch which may be located remotely from the grounding device and connected to the device through a cable 41 shown in Fig. 2. The power for operating the solenoid 38 may be supplied through a cable 42, also shown in Fig. 2. The grounding switch 25 may be manually closed by means of a lever 43 which may be inserted into the mechanism through a slot 44. However, the lever 43 cannot be inserted until after a cover plate 45 is removed from the housing for the solenoid mechanism.

The grounding switch 25 has a manually operable trip bar 46. The trip bar may be locked in an inoperable position by means of a padlock 47 after the grounding switch is closed, thereby locking the switch closed to insure the safety of anyone working on the grounded line. The trip bar 46 may also be locked in its unlatched position by means of a key interlock 48, thereby preventing closing of the grounding switch. A key 49 for the interlock 48 may be removed only under predetermined conditions, as will be described more fully hereinafter.

In order to provide for testing and phasing out of the circuits connected to the disconnecting contact members 12 and 13, two sets of test sockets 51 and 52 are provided. As shown in Fig. 1 the test sockets 51 are electrically connected to the contacts 13 through conductors 53. The test sockets 52 are connected to the selector switch 14 through conductors 54. As indicated by the broken lines, the conductor 53 may be connected to the primary disconnecting contacts 12, thereby connecting the sockets 51 to these contacts if it is so desired.

Test plugs 55 may be inserted into the test sockets 51 and 52 through openings 56 and 57 provided in the front of the truck structure 10 for the bus test sockets 51 and the selector switch sockets 52, respectively. Slidable cover plates 58 and 59 are provided for preventing the insertion of the test plugs 55 when the plates are in their closed positions.

As shown most clearly in Fig. 2, the cover plates 58 and 59 are provided with openings 61 and 62, respectively, which line up with the port openings 56 and 57, respectively, when the cover plates are in their open position. A key interlock 63 is provided for controlling the operation of the cover plate 58. Thus the cover plate can be opened only under predetermined conditions, as will be described more fully hereinafter. A padlock 64 may be utilized to lock the cover plate 59 closed if desired. The padlock 64 secures a hasp 65 on the plate 59 to a bracket 66 on the front of the truck structure 10. A bolt 67 of the key interlock 63 engages a hasp 68 on the cover plate 58. The hasps 65 and 68 extend through slots provided in a plate 69 on the front of the truck structure 10 and are attached to the cover plates, thereby functioning as handles for moving the cover plates.

A key interlock 71 is provided for controlling the operation of the selector switch 14. The interlock 71 is disposed to engage a plate 72 secured to the operating shaft 26. The functioning of the various key interlocks will be described more fully hereinafter.

Mechanical interlocking is also provided for controlling the operation of the selector switch 14. As shown most clearly in Figs. 7, 8 and 9, a spring-biased latching bolt 73 is carried by a plate 74 which is secured to the shaft 26. An interlocking plate 75 is secured to supports 76 which, in turn, are secured to a bracket 77 attached to one side of the truck structure 10.

As shown most clearly in Fig. 9, the interlocking plate 75 has an opening 78 therein which comprises two circular portions 79 joined by a restricted center portion 80. A similar opening 81 is provided in the side of the truck structure 10. The latching bolt 73 has an enlarged circular portion 82 on each end. The enlarged portions 82 can enter the enlarged portions 79 of the openings 78 and 81, but cannot enter the restricted portions 80 of these openings. A spring 83 biases the enlarged portions 82 of the bolt 73 toward the openings 78 and 81.

The operating handle 32 has an extension 84 thereon, the end of which will pass through the enlarged portions 79 of the opening 81 but will not pass through the restricted portion of this opening. Thus, the latch bolt 73 is pushed inwardly to release the selector switch 14 when the handle 32 is inserted on the end of the shaft 26 to actuate the shaft. The selector switch may be operated from one position to the other by means of the handle 32 when the latching bolt 73 is released, and the handle 32 then removed which permits the spring 83 to bias the bolt 73 to its latching position to lock the selector switch.

However, the handle 32 cannot be removed with the selector switch in a mid-position. The switch must be fully closed in one or the other of its positions before the handle 32 can be removed. Since the handle 32 is on the side of the truck structure 10 when it is in position to operate the selector switch, the truck structure cannot be inserted into the cell with the handle in this position. As shown in Fig. 7, the handle 32 will strike a side 90 of the cell. Therefore, the truck structure cannot be inserted into the cell unless the selector switch is in one or the other of its fully closed positions.

An indicating target 85 is carried by the plate 74 and is visible through an opening 86 in the front of the truck structure, thereby indicating the position of the selector switch. The movement of the selector switch may be limited by adjustable screws 87 which are disposed in the supports 76. The screws 87 engage the plate 74 to limit its travel, thereby limiting the rotation of the shaft 26 and the travel of the selector switch 14.

Since the ungrounded circuit and the primary disconnecting contact members connected thereto may be energized while the circuit connected to the primary disconnecting contact is grounded, it is desirable to isolate the non-selected disconnecting contact members from the selected and grounded contact members, as these contact members are disposed relatively closely together in the truck structure. As shown in Fig. 1, fixed barriers 91, 92, 93 and 94 are mounted in the truck structure to substantially enclose the contact members 17 and 18 of the primary disconnecting contacts 12 and 13, respectively.

In order to completely isolate the selected contact members from the non-selected members, a vertically disposed barrier 95 is actuated by the selector switch 14 as the selector switch is moved from one position to the other, and a horizontally disposed barrier 96 is carried by spring-biased push rods 97 and is actuated to its closed position by push rods engaging a member 98 of the cell structure when the truck 10 is inserted into the cell. The barrier 96 is biased to its open position by a spring 99 in each push rod 97 when the truck 10 is removed from the cell. In this manner, the selector switch 14 which, as previously explained, can be operated only when the truck is removed from the cell, may be actuated from one position to the other without interference by the barriers 96. However, the contact members 17 and 18 are completely isolated from each other by the barriers 95 and 96 when the truck 10 is inserted into the switchgear housing or cell.

Figure 6:
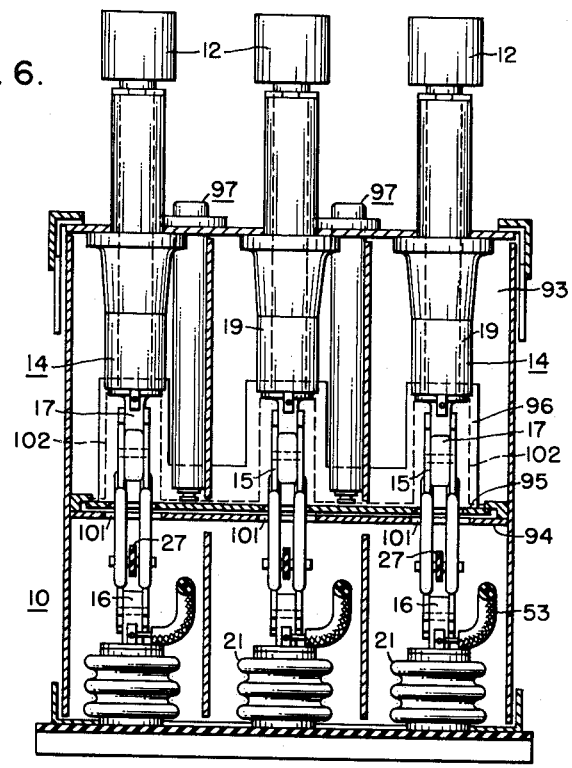
Fig. 6 is a view, in section, taken along the line VI—VI in Fig. 4.

As shown most clearly in Figs. 1 and 6, the vertically disposed fixed barrier 94 has openings 101 therein to permit movement of the blades 15 of the selector switch 14 between their two extreme positions. These openings are covered by the vertically movable barrier 95 which, as explained hereinbefore, moves with the switch blades 15.

Figure 3:
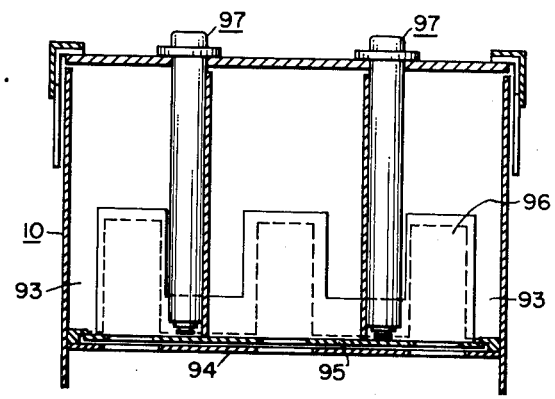
Fig. 3 is a view, in section, taken along the line III—III in Fig. 4, the isolating barriers for the selector switch being closed.
Figure 4:
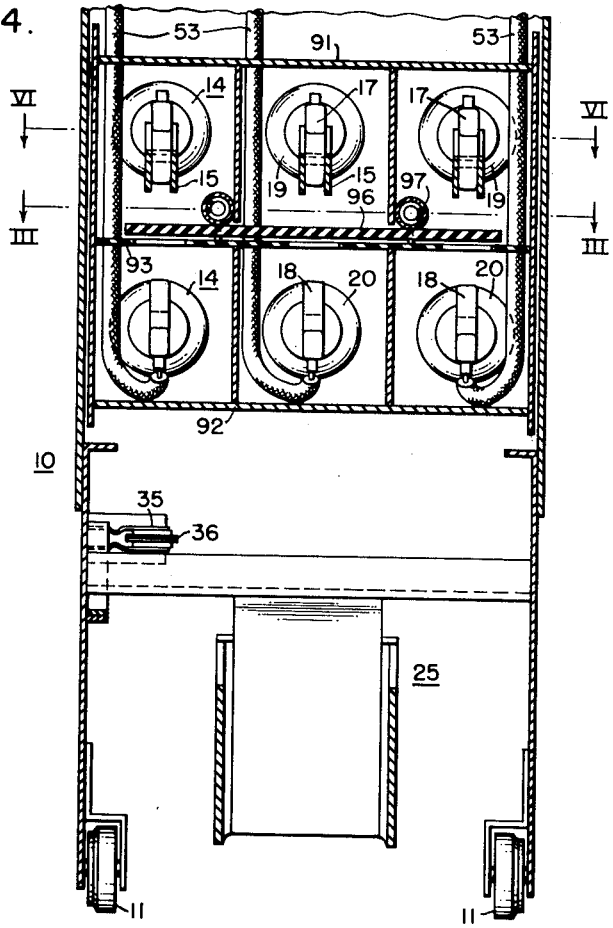
Fig. 4 is a view, in section, taken along the line IV—IV in Fig. 1.
Figure 5:
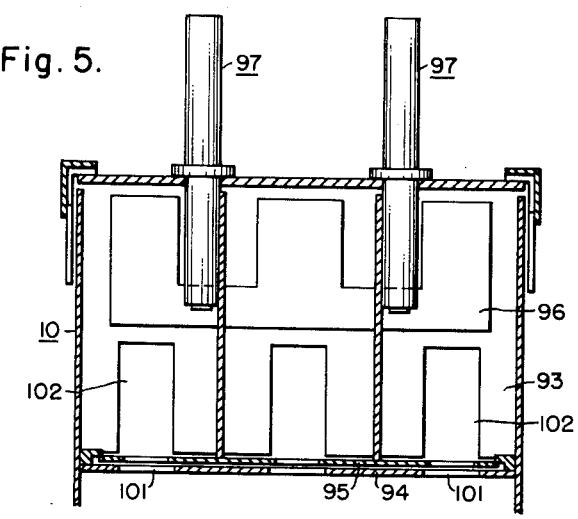
Fig. 5 is a view, similar to Fig. 3, the isolating barriers being open.

As shown most clearly in Figs. 3, 4 and 5, the horizontally disposed fixed barrier 93 has openings 102 therein to permit movement of the switch blades 15. These openings are covered by the horizontally movable barrier 96 when the truck structure 10 is inserted into the switchgear cell and the push rods 97 are compressed by engaging the member 98 of the cell structure. As shown in Fig. 5, the openings 102 are uncovered when the truck unit 10 is removed from the cell and the push rods 97 are released.

As shown in Figs. 10, 11 and 12, each push rod 97 comprises a cylindrical tube 103 having a slot 104 extending part of the length of the tube. A rod 105 is disposed inside the tube 103 and inside the spring 99. One end of the rod 105 is supported by a plug 106 inserted in one end of the tube 103 and the other end of the rod is slidably disposed in an eye bolt 107 which is attached to the fixed barrier 93. The spring 99 is disposed between the eye bolt 107 and the plug 106. An eye bolt 108 is attached to the end of the rod 105 opposite the plug 106. The eye bolt 108 is attached to the movable barrier 96. A relatively short buffer spring 109 is disposed on the rod 105 between the eye bolt 108 and a shoulder 111 on the rod 105.

It will be seen that when the plug 106 engages the member 98 in the cell structure, the tube 103 and the rod 105 are pushed to compress the spring 99 as the rod 105 slides through the eye bolt 107. The barrier 96 is moved along the barrier 93 by the eye bolt 108, thereby covering the openings 102 in the barrier 93. The buffer spring 109 functions to prevent breakage of the barrier 96 by the barrier striking fixed portions of the frame structure near the end of the travel of the push rod 97. When the truck unit is withdrawn from the cell, the spring 99 moves the barrier 96 to the position shown in Fig. 5 in which the openings 102 are uncovered to permit operation of the selector switch 14 in the manner previously described.

As previously explained, the circuit connections for the combined grounding and testing device are diagrammatically shown in Fig. 13. When the selector switch blades 15 are in the position shown, the power circuit connected to the primary disconnecting contacts 12 may be grounded by closing the grounding switch 25. If it is desired to ground the circuits connected to the primary disconnecting contact members 13, the selector switch blades 15 are actuated to the position in which they engage contact members 18. The test plugs 51 and 52 may be utilized for testing the voltage of the power circuits or for phasing out the power circuits or for applying a test potential to the power circuits.

As explained hereinbefore, certain protective interlocking features are provided to prevent improper operation of the grounding and testing device. The truck unit is provided with a mechanical device similar to devices provided on circuit breaker units for levering the truck unit into the cell. This device is operated by a shaft 112. Other details of the device have not been shown since it is similar in structure to devices utilized on circuit breaker units. This levering device is so constructed that the truck unit cannot be fully inserted into the switchgear housing or cell unless the ground switch 25 is open.

The truck unit cannot be levered into the housing with the selector switch 14 in an intermediate position. This is accomplished by making the switch operating handle 32 removable only when the selector switch is in one or the other of its operating positions, as previously described.

The truck unit cannot be levered into the housing with the selector switch operating handle 32 in place. As previously explained, the shaft 26 for operating the selector switch extends through one side of the truck unit and the handle 32 prevents the insertion of the truck unit into the cell by striking the side of the cell when the handle is in position on the end of the shaft 26.

The selector switch cannot be operated when the truck unit is in the housing, since the handle 32 cannot be placed on the end of the shaft 26 when the unit is in the housing and can be inserted on the shaft 26 only when the truck is withdrawn. The spring biased latch 73 is released by the insertion of the operating handle on the shaft 26, thereby permitting operation of the selector switch. The end of the latch bolt 73 extends through the side of the truck unit when the handle is removed to indicate that the selector switch is latched.

The test port cover 58 can be opened only when the selector switch is in the position in which it engages contact member 17 if cable 53 is connected to contact 18 (or contact member 18 if cable 53 is connected to contact 17), and the ground switch is in the open position. The two-key interlock 63 requires keys from the selector switch interlock 71 and from the solenoid interlock 48 to unlock the cover 58. The selector switch interlock key is removable only when the switch is in a predetermined position. The solenoid mechanism interlock key is removable only when the mechanism trip lever is unlatched, thereby opening the grounding switch. As a further precaution the interlock may be provided with a switch which opens the control circuits for the grounding switch. The purpose of the key interlocking is twofold: (a) To prevent false phasing out test by having same potential at both test sockets 51 and 52. (b) To prevent closing grounding switch during phasing out when voltage will be present and grounding not desired.

As previously explained, the selector switch test port cover 59 may be padlocked closed if desired. Also, the ground switch may be padlocked in the closed position by padlocking the trip lever 46 in an inoperable position after the ground switch is closed, thereby insuring the safety of any person working on the circuit grounded by the ground switch.

From the foregoing description, it is apparent that we have provided a combined grounding and testing device which may be inserted into a metal clad switchgear housing in place of a removable circuit breaker unit to provide a convenient means for grounding a selected circuit for maintenance work, or for applying potential for cable testing, or for providing access to both the bus and the line circuits for phasing out tests. The device is provided with protective interlocks and safety features to insure the safety of the personnel performing any of the foregoing operations. The solenoid closing mechanism for the grounding switch is so constructed that it is capable of closing against a live circuit if it is necessary to do so because the circuit has not been previously cleared. In such a case, it is expected that the applying of the ground will cause the relaying system at the source of power to clear the circuit.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a combined grounding and testing device for insertion into a metal clad switchgear cell, in combination, a frame structure movable into the cell, two sets of contact members carried by the structure, a double-throw selector switch, a rotatable shaft for operating said switch to engage one or the other of said sets of contact members, a removable handle for actuating said shaft, said handle being removable from said shaft only when said switch engages one or the other of said sets of contact members, said handle being disposed to prevent insertion of the device into the cell when the handle is on the shaft, a grounding switch carried by the structure, said grounding switch being electrically connected to said selector switch, a barrier actuated by the selector switch, and an additional barrier actuated by movement of the device into the cell to isolate said contact members.

2. In a combined grounding and testing device for insertion into a metal clad switchgear cell, in combination, a frame structure movable into the cell, two sets of contact members carried by the structure, a double-throw selector switch, a rotatable shaft for operating said switch to engage one or the other of said sets of contact members, a removable handle for actuating said shaft, said handle being removable from said shaft only when said switch engages one or the other of said sets of contact members, said handle being disposed to prevent insertion of the device into the cell when the handle is on the shaft, a grounding contact member carried by the structure, a grounding switch carried by the structure for electrically connecting the selector switch to the grounding contact member, a barrier actuated by the selector switch, and an additional barrier actuated by movement of the device into the cell to isolate said contact members.

3. In a combined grounding and testing device for insertion into a metal clad switchgear cell, in combination, a frame structure movable into the cell, two sets of contact members carried by the structure, a double-throw selector switch, a rotatable shaft for operating said switch to engage one or the other of said sets of contact members, a removable handle for actuating said shaft, said handle being removable from said shaft only when said switch engages one or the other of said sets of contact members, said handle being disposed to prevent insertion of the device into the cell when the handle is on the shaft, a grounding contact member carried by the structure, an electrically operated remotely controlled grounding switch carried by the structure for electrically connecting the selector switch to the grounding contact member, a barrier actuated by the selector switch, and an additional barrier actuated by movement of the device into the cell to isolate said contact members.

4. In a combined grounding and testing device for insertion into a metal clad switchgear cell, in combination, a frame structure movable into the cell, two sets of contact members carried by the structure, a double-throw selector switch, a rotatable shaft for operating said switch to engage one or the other of said sets of contact members, a removable handle for actuating said shaft, said handle being removable from said shaft only when said switch engages one or the other of said sets of contact members, said handle being disposed to prevent insertion of the device into the cell when the handle is on the shaft, a grounding contact member carried by the structure, an electrically operated remotely controlled grounding switch carried by the structure for electrically connecting the selector switch to the grounding contact member, a manually operable trip lever for opening said grounding switch, a barrier actuated by the selector switch, and an additional barrier actuated by movement of the device into the cell to isolate said contact members.

5. In a combined grounding and testing device for insertion into a metal clad switchgear cell, in combination, a frame structure movable into the cell, two sets of contact members carried by the structure, a double-throw selector switch, a rotatable shaft for operating said switch to engage one or the other of said sets of contact members, a removable handle for actuating said shaft, said handle being removable from said shaft only when said switch engages one or the other of said sets of contact members, said handle being disposed to prevent insertion of the device into the cell when the handle is on the shaft, a grounding contact member carried by the structure, an electrically operated remotely controlled grounding switch carried by the structure for electrically connecting the selector switch to the grounding contact member, a manually operable trip lever for opening said grounding switch, lock means for selectively locking said trip lever in either a latched or an unlatched position, thereby controlling the opening and the closing of the grounding switch, a barrier actuated by the selector switch, and an additional barrier actuated by movement of the device into the cell to isolate said contact members.

6. In a combined grounding and testing device for insertion into a metal clad switchgear cell, in combination, a frame structure movable into the cell, two sets of contact members carried by the structure, a double-throw selector switch, a rotatable shaft for operating said switch to engage one or the other of said sets of contact members, a removable handle for actuating said shaft, said handle being removable from said shaft only when said switch engages one or the other of said sets of contact members, said handle being disposed to prevent insertion of the device into the cell when the handle is on the shaft, mechanical interlocking means engaging said shaft and actuated by said handle for controlling the operation of said switch, said interlocking means being releasable by said handle only when the device is removed from the cell, a grounding contact member carried by the structure, and a grounding switch carried by the structure for electrically connecting the selector switch to the grounding contact member.

7. In a combined grounding and testing device for insertion into a metal clad switchgear cell, in combination, a frame structure movable into the cell, two sets of contact members carried by the structure, a double-throw selector switch, a rotatable shaft for operating said switch to engage one or the other of said sets of contact members, a removable handle for actuating said shaft, said handle being removable from said shaft only when said switch engages one or the other of said sets of contact members, said handle being disposed to prevent insertion of the device into the cell when the handle is on the shaft, mechanical interlocking means engaging said shaft and actuated by said handle for controlling the operation of said switch, said interlocking means being releasable by said handle only when the device is removed from the cell, a grounding contact member carried by the structure, and a solenoid-closed remotely-controlled grounding switch carried by the structure for electrically connecting the selector switch to the grounding contact member.

8. In a combined grounding and testing device for insertion into a metal clad switchgear cell, in combination, a frame structure movable into the cell, two sets of contact members carried by the structure, a double-throw selector switch, a manually operable shaft for operating said switch to engage one or the other of said sets of contact members, mechanical interlocking means engaging said shaft for controlling the operation of said switch, said interlocking means being releasable only when the device is removed from the cell, a grounding contact member carried by the structure, a solenoid-closed remotely-controlled grounding switch carried by the structure for electrically connecting the selector switch to the grounding contact member, and a manually operable trip lever for opening said grounding switch.

9. In a combined grounding and testing device for insertion into a metal clad switchgear cell, in combination, a frame structure movable into the cell, two sets of contact members carried by the structure, a double-throw selector switch operable to engage one or the other of said sets of contact members, mechanical interlocking means for preventing operation of said switch while the device is in position in the cell, said interlocking means being releasable only when the device is removed from the cell, a grounding contact member carried by the structure, a solenoid-closed remotely-controlled grounding switch carried by the structure for electrically connecting the selector switch to the grounding contact member, a manually operable trip lever for opening said grounding switch, and lock means for selectively locking said trip lever in either a latched or an unlatched position, thereby controlling the opening and the closing of the grounding switch.

10. In a combined grounding and testing device for insertion into a metal clad switchgear cell, in combination, a frame structure movable into the cell, two sets of contact members carried by the structure, a double-throw selector switch, a rotatable shaft for operating said switch to engage one or the other of said sets of contact members, a removable handle for actuating said shaft, said handle being removable from said shaft only when said switch engages one or the other of said sets of contact members, said handle being disposed to prevent insertion of the device into the cell when the handle is on the shaft, spring biased interlocking means engaging said shaft for controlling the operation of said switch, said means being released by said handle when it is in position on said shaft, a grounding contact member carried by the structure, and a grounding switch carried by the structure for electrically connecting the selector switch to the grounding contact member.

11. In a combined grounding and testing device for insertion into a metal clad switchgear cell, in combination, a frame structure movable into the cell, two sets of contact members carried by the structure, a double-throw selector switch having hinged switch blades, said switch blades being manually operable to engage one or the other of said sets of contact members, two sets of test sockets mounted in the structure for receiving testing plugs, one set of test sockets being selectively electrically connected to one set of said contact members, the other set of test sockets being electrically connected to the hinge terminals of the selector switch, an openable cover for each set of test sockets, a grounding switch mounted in the structure and electrically connected to the hinge terminals of the selector switch, and lock means associated with said grounding switch and said selector switch for controlling the opening of the cover for one set of test sockets.

12. In a combined grounding and testing device for insertion into a metal clad switchgear cell, in combination, a frame structure movable into the cell, two sets of contact members carried by the structure, a double-throw selector switch having hinged switch blades, said switch blades being manually operable to engage one or the other of said sets of contact members, two sets of test sockets mounted in the structure for receiving testing plugs, one set of test sockets being selectively electrically connected to one set of said contact members, the other set of test sockets being electrically connected to the hinge terminals of the selector switch, an openable cover for each set of test sockets, a grounding switch mounted in the structure and electrically connected to the hinge terminals of the selector switch, and key interlocking means associated with said grounding switch and said selector switch for controlling the opening of the cover for one set of test sockets.

13. In a combined grounding and testing device for insertion into a metal clad switchgear cell, in combination, a frame structure movable into the cell, two sets of contact members carried by the structure, a double-throw selector switch having hinged switch blades, said switch being operable to engage one or the other of said sets of contact members, two sets of test sockets mounted in the structure for receiving testing plugs, one set of test sockets being selectively electrically connected to one set of said contact members, the other set of test sockets being electrically connected to the hinge terminals of the selector switch, an openable cover for each set of test sockets, a grounding switch mounted in the structure and electrically connected to the hinge terminals of the selector switch, and key interlocking means associated with said grounding switch and said selector switch for permitting the opening of the cover for one set of test sockets only when said grounding switch and said selector switch are in predetermined positions.

14. In a combined grounding and testing device for insertion into a metal clad switchgear cell, in combination, a frame structure movable into the cell, two sets of contact members carried by the structure, a double-throw selector switch having hinged switch blades, a rotatable shaft for operating said switch to engage one or the other of said sets of contact members, two sets of test sockets mounted in the structure for receiving testing plugs, one set of test sockets being selectively electrically connected to one set of said contact members, the other set of test sockets being electrically connected to the hinge terminals of the selector switch, an openable cover for each set of test sockets, a grounding switch mounted in the structure and electrically connected to the hinge terminals of the selector switch, a key interlock for the grounding switch, another key interlock for the selector switch, and a third key interlock for the cover for one set of test sockets, said interlocks being constructed to permit the opening of said cover only when said switches are in predetermined positions.

15. In a combined grounding and testing device for insertion into a metal clad switchgear cell, in combination, a frame structure movable into the cell, two sets of contact members carried by the structure, a double-throw selector switch having hinged switch blades, a rotatable shaft for operating said switch to engage one or the other of said sets of contact members, two sets of test sockets mounted in the structure for receiving testing plugs, one set of test sockets being selectively electrically connected to one set of said contact members, the other set of test sockets being electrically connected to the hinge terminals of the selector switch, an openable cover for each set of test sockets, a grounding switch mounted in the structure and electrically connected to the hinge terminals of the selector switch, a key interlock for the grounding switch, another key interlock for the selector switch, and a third key interlock for the cover for one set of test sockets, said interlocks being constructed to permit the opening of said cover only when the grounding switch is in open and the selector switch is in a predetermined position.

16. In a combined grounding and testing device for insertion into a metal clad switchgear cell, in combination, a frame structure movable into the cell, two sets of contact members carried by the structure, a double-throw selector switch operable to selectively engage one or the other of said sets of contact members, mechanical means for automatically locking the selector switch in the selected position, said means being releasable only when the device is removed from the cell, a grounding contact member carried by the structure, a grounding switch for electrically connecting the selector switch to the grounding contact member to ground the selected contact member, barriers fixed in the frame structure for protecting both sets of contact members, and barriers movably mounted in the frame structure, said barriers being actuated in different planes for separating the non-selected contact members from the grounded contact members.

17. In a combined grounding and testing device for insertion into a metal clad switchgear cell, in combination, a frame structure movable into the cell, two sets of contact members carried by the structure, a double-throw selector switch operable to selectively engage one or the other of said sets of contact members, mechanical means for automatically locking the selector switch in the selected position, said means being releasable only when the device is removed from the cell, a grounding contact member carried by the structure, a grounding switch for electrically connecting the selector switch to the grounding contact member to ground the selected contact member, barriers fixed in the frame structure for protecting both sets of contact members, and barriers carried by the frame structure and movable in horizontal and vertical planes in the frame structure for separating the non-selected contact members from the grounded contact members.

18. In a combined grounding and testing device for insertion into a metal clad switchgear cell, in combination, a frame structure movable into the cell, two sets of contact members carried by the structure, a double-throw selector switch operable to selectively engage one or the other of said sets of contact members, mechanical means for automatically locking the selector switch in the selected position, said means being releasable only when the device is removed from the cell, a grounding contact member carried by the structure, a grounding switch for electrically connecting the selector switch to the grounding contact member to ground the selected contact member, barriers fixed in the frame structure for protecting both sets of contact members, a movable barrier actuated in one plane in the frame structure by the selector switch, and an additional movable barrier actuated in another plane in the frame structure when the frame structure is inserted into the cell, said barriers cooperating to isolate the non-selected contact members from the grounded contact members.

19. In a combined grounding and testing device for insertion into a metal clad switchgear cell, in combination, a frame structure movable into the cell, two sets of contact members carried by the structure, a double-throw selector switch operable to selectively engage one or the other of said sets of contact members, mechanical means for automatically locking the selector switch in the selected position, said means being releasable only when the device is removed from the cell, a grounding contact member carried by the structure, a grounding switch for electrically connecting the selector switch to the grounding contact member to ground the selected contact member, barriers fixed in the frame structure for protecting both sets of contact members, a movable barrier actuated in one plane by the selector switch, and an additional barrier movable in another plane, said additional barrier being spring-biased in one direction when the frame structure is removed from the cell and actuated in the opposite direction when the frame structure is inserted into the cell, said barriers cooperating to separate the non-selected contact members from the grounded contact members.

References Cited in the file of this patent
UNITED STATES PATENTS

| | | |
|---|---|---|
| 2,340,082 | Sauers | Jan. 25, 1944 |
| 2,363,364 | Rugg | Nov. 21, 1944 |
| 2,443,664 | Rathfus | June 22, 1948 |
| 2,579,992 | Wood | Dec. 25, 1951 |
| 2,600,304 | Krida | June 10, 1952 |